Aug. 19, 1969   H. R. FISCHER   3,462,124
DUCT RODDER HAVING COLLAPSIBLE TRACTION HEADS
Filed May 22, 1967   2 Sheets-Sheet 2

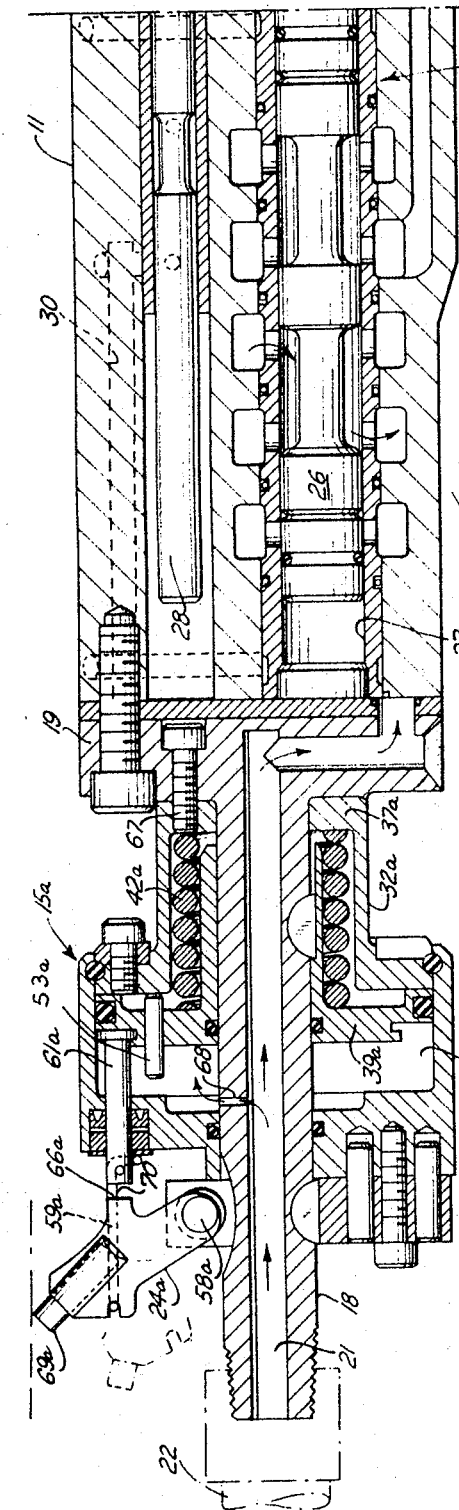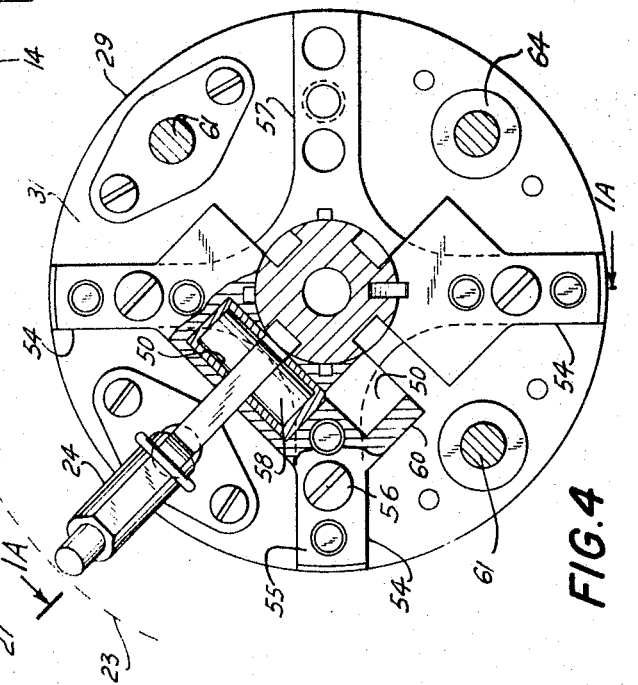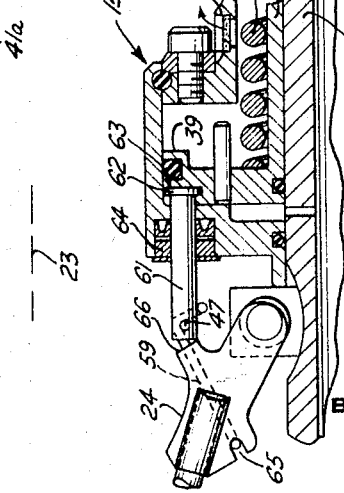

United States Patent Office 3,462,124
Patented Aug. 19, 1969

3,462,124
DUCT RODDER HAVING COLLAPSIBLE TRACTION HEADS
Howard R. Fischer, New Hartford, N.Y., assignor to Chicago Pneumatic Tool Company, New York, N.Y., a corporation of New Jersey
Filed May 22, 1967, Ser. No. 640,312
Int. Cl. E21c 29/16
U.S. Cl. 254—134.6        10 Claims

ABSTRACT OF THE DISCLOSURE

A duct rodder for threading a line through a duct, having a piston motor comprising a housing and a piston, the one pneumatically advanceable relative to the other while the other is held stationary. A traction head being mounted to the housing at the rear of the rodder, and another being mounted to the piston rod at the front of the rodder. Each head having legs pneumatically pivotable to contact the duct wall; and adapted to grip the wall so as to hold the related housing or piston, as the case may be, stationary when a rearward force is applied to the head, and the legs being releasable from gripping condition when a forward force is applied to the head. A traction piston in each head normally maintaining the legs in contact with the wall is operable upon shut-off of pneumatic power to the rodder to collapse the legs out of contact with the wall so as to permit the rodder to be pulled by means of its air supply line backwardly out of the duct.

BACKGROUND OF THE INVENTION

The invention relates to the art of duct rodding devices of the type having a piston motor unit comprising a housing and a piston alternately movable one relative to the other when the other is held stationary, the housing and piston each carrying a device for gripping the duct wall at alternate times to premit relative advance of the other.

A duct rodder of this nature is known from application Ser. No. 465,990, filed June 22, 1965, granted May 30, 1967 as Patent No. 3,322,395. It is equipped with duct gripping elements of a flexible nature which remain at all times in contact with the duct wall and which must be reversely flexed relative to the wall to permit backing and withdrawal of the rodder from the duct. Instead of the known flexible grippers, the present invention employs traction heads having gripping legs which are selectively movable into engagement with the duct wall for gripping action to permit the advance of the rodder by means of its motor, or are movable free of the duct wall to allow the rodder to be pulled by the operator backwardly out of the duct by means of an attached air supply line.

BRIEF SUMMARY OF INVENTION

In accordance with the invention, there is provided in a duct rodder having an axially extending support, a traction head having a cylinder body mounted axially to the support, a group of legs arranged about the cylinder body in concentric relation to the support for pivotal movement from a normal collapsed condition toward the support to an outward condition from the support beyond the periphery of the cylinder body, and a piston connected to the group of legs having selective reciprocable movement in the cylinder body for effecting pivoting of the legs from one condition to the other.

BRIEF DESCRIPTION OF THE DRAWINGS

In the accompanying drawings:
FIGS. 1 and 1A are continuations of one another; FIG. 1 representing the rear portion of a duct rodder embodying the invention, and FIG. 1A representing the forward portion; the front traction head shown in FIG. 1A being a section taken on line 1A—1A of FIG. 4;

FIG. 3 is a fragmentary detail of the means for venting the chamber of the rear traction head;

FIG. 4 is a rear end view of the cylinder of a traction head indicating the association of the traction legs with the traction head; and FIG. 5 is a fragmentary detail showing the normal or collapsed condition of one of the traction heads.

DETAILED DESCRIPTION OF PREFERRED EMBODIMENT

Figure 1A:
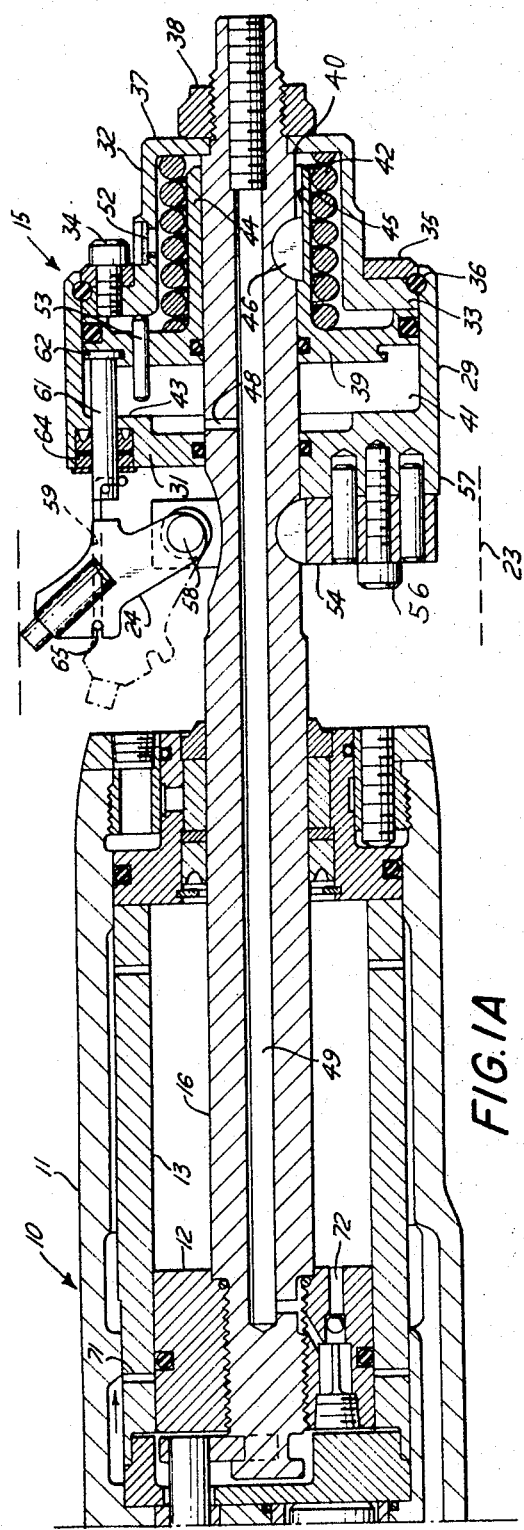

In the accompanying drawing is disclosed a duct rodder having as its body a motor unit 10. The latter comprises a generally cylindrical elongated housing 11; a piston 12 pneumatically movable axially of a chamber 13 of the housing; and an air control valve mechanism 14 controlled in its operation by movement of the piston 12 so as to direct operating air alternately to opposite ends of the piston chamber 13. A front traction head 15 is axially mounted upon an external end of the piston rod 16; and a rear traction head 15a is axially mounted upon a cylindrical stem 17 extending from a back wall 19 of the housing. This stem provides an inlet passage 21 connecting a pressure air supply hose line 22 with the control valve mechanism. The housing 11 and the traction heads 15 and 15a are coaxial; and their outer diameters are smaller than the inner diameter of the duct 23 through which the rodder is to travel, so as to provide a desirable clearance between the rodder and the duct wall. This clearance enables a ring of traction legs 24 pivotally supported to the front traction head in concentric relation to the piston rod 16, and an identical ring of traction legs 24a pivotally supported to the rear traction head in concentric relation to the stem 18 to be pivoted from a collapsed condition (broken line FIGS. 1 and 1A) to a generally radial outward condition (full line) into contact with the surrounding duct wall.

The piston rod 16 is adapted to be pneumatically extended axially relative to the housing 11 to carry the front traction head 15 forwardly in the duct when the legs of the rear traction head 15a grip the duct wall sufficiently to hold the housing 11 stationary. And the housing 11 is adapted to be pneumatically advanced axially relative to the piston rod 16 to pull the rear traction head 15a with it in the duct, when the legs of the front traction head grip the duct wall sufficiently to hold the piston rod stationary.

The air control valve mechanism 14, which is described in detail in the co-pending application Ser. No. 465,990 (Patent 3,322,395), includes an air distributing slide valve 26 pneumatically shiftable in a distributing valve chamber 27 so as to direct operating air received from the inlet passage 21 alternately to opposite ends of the piston chamber 13. Shifting of the distributing valve is controlled by means of a drag valve 28 anchored to the piston for axial movement with the latter as a unit. Operating air passes from the inlet passage 21 through restricted branch ports (not numbered) to opposite ends of the distribution valve chamber to effect shifting of the distributing valve. As the drag valve obtains a forward position with the piston, as in FIG. 2, one end of the distributing valve chamber is caused to be vented so as to allow operating air to be applied to the opposite end to shift the distributing valve to direct operating air in volume to the forward end of the piston chamber; and the reverse condition occurs as the drag valve obtains a rearward position with the piston; all in a manner more detailed in Patent No. 3,322,395.

Here, the improvement in the duct rodder lies in the provision of the traction heads 15 and 15a.

The front traction head 15 includes a cup-like cylinder body or housing 29 having a back wall 31 at its rear, and having an open front end closed by means of a crowned cap 32. An annular flange 33 of the cap is fitted into the cylinder. A ring of bolts 34 (one being shown) clamp an outer annular plate 35 and the flange 33 into rigid abutment with opposite areas of a retainer ring 36 seated in the wall of the cylinder. An inturned annular end flange 37 of the crowned cap is held by means of a nut 38 in rigid abutment with a shoulder 40 of the piston rod. A traction piston 39 reciprocable in a chamber 41 of the cylinder is constantly urged by a return spring 42 into abutment with a rear shoulder 43 of the chamber to a normal condition, as in FIG. 5. The traction piston is guided in its movement by means of a sleeve portion 44 bearing upon the motor piston rod 16. A longitudinal keyway 45 in the piston sleeve 44 cooperates with a key 46 of the motor piston rod to limit the traction piston to relative axial movement and to curb it against relative rotation. The return spring 42 is disposed in the crown portion of the cap 32 in surrounding relation to the piston sleeve.

The traction piston is movable to the forward end of its chamber, as in FIG. 1A, against the resistance of spring 42 by means of pressure air entering the rear of the chamber 41 from a radial port 48 connected to a feed passage 49 in the piston rod 16. To avoid sluggish piston movement, a vent 51 (FIG. 5) for the forward end of chamber 41 is provided in the crowned cap 32. An air filter 52 of the porous disc type is seated in the vent to guard against entrance of foreign particles to the interior of chamber 41. Rearward movement of the traction piston 39 to the position shown in FIG. 5 is obtained by shutting off flow through port 48 and by relieving the rear of chamber 41 of pressure air. Residual air trapped at the rear of the piston which might otherwise cause sluggish movement is able to bleed around a loose floating pin 53 in the piston to the vented forward end of chamber 41.

The function of the traction piston is to cause pivoting of the traction legs 24 into or out of engagement with the surrounding wall of the duct. A plurality of traction legs are provided, here four in number, each pivotally supported between a pair of holders 54 and arranged in equally spaced relation to one another in concentric relation to the motor piston rod 16. FIG. 4 shows one of the traction legs and indicates the position of the other three which are ninety degrees apart. Each holder 54 is on the form of a Y structure, the stem 55 of which is rigidly bolted as at 56 upon a separate radial land or rib 57 formed upon the rear wall of the traction cylinder. Each arm 60 of a holder branches away from the other to a position in opposed relation to an arm of the next succeeding holder, as appears in FIG. 4. Three of the four holders are shown in FIG. 4. Each traction leg 24 has a pin 58 extending transversely of opposite faces of its lower end, which pin is supported for pivoting in sockets 50 in an opposed pair of arms of the holders. Each traction leg is connected by means of an elastic ring 59 to a separate pusher pin 61 carried by the piston. Each pusher pin has a square headed end 62 anchored in a separate peripheral keeper slot 63 formed in the traction piston. The shank of the pusher pin extends slidably through a packing seal 64 externally of the rear of the traction head. Each elastic is looped at one end over a cross pin 47 of the pusher pin, and is engaged at its other end in a notch 65 at the rear of the related traction leg. The elastic biases the leg forwardly to normally abut a squared ear 66 of the leg against a squared end of the pusher pin, as indicated in the collapsed condition of the leg in FIG. 5.

The rear traction head 15a is axially mounted at the rear of the motor housing upon the inlet stem 18. Its structure is substantially identical to that of the front traction head, differing in only minor detail. It differs in that the forward end flange 37a of its crowned cap 32a is thickened as in FIGS. 1 and 3 to receive a ring of bolts 67 mounting it to the back wall 19 of the motor housing; and in that the vent 51a for the forward end of its piston chamber 41a opens through the flange 37a and the back wall 19 of the motor housing into a venting passage 30 of the control valve mechanism 14.

The operation of the duct rodder as improved by the traction heads 15 and 15a is as follows: With the air supply from source shut "off," the traction legs of both heads will be in their normal collapsed condition under the load of the spring biased traction pistons 39 and 39a acting through the related pusher pins, as in FIG. 5. In this normal "at rest" condition, the duct rodder may be freely inserted into the duct since the traction legs will be out of contact with the surrounding duct wall, as indicated in broken line in FIGS. 1 and 1A.

Next, after the air supply from source is turned "on," operating air flows over the source connected hose line 22 to the inlet passage 21. Air from passage 21 flows in restricted volume through radial port 68 to the rear of chamber 41a of the rear traction head 15a to drive the traction piston 39a to its forward condition (full line FIG. 1) causing the pusher pins 61a to pivot the related traction legs 24a by means of the elastics 59a clockwise into contact with the surrounding duct wall. As long as operating air is flowing through the inlet passage 21 and radial port 68, this pressurized forward condition of the traction piston is maintained against the resistance of its return spring 42a. As the hard studs 69a of wear resistant material fitted in the extremities of the legs contact the duct wall they are blocked by the wall against pivoting further clockwise. The pusher pins 61a, however, are pulled by the traction piston 39a to their foremost positions, the elastic rings 59a stretch in this action as the pusher pins are drawn by the piston away from the ears 66a of the legs. The legs obtain a position in general conical array in contact with the wall under the clockwise tension of the elastics at an angle acute to the axis of the rodder and inclined rearwardly from vertical as appears in FIG. 1. At this time, the sharp edges of the studs 69a merely contact the duct wall under the tension of the elastics but do not bite into the wall. As indicated by the space 70, the legs could be pulled further clockwise a limited degree were it not for the surrounding duct wall, until the ears 66a of the legs abut the pusher pins 61a. Nevertheless, the full extent of this clockwise movement is limited to less than 90°. Accordingly, the legs even when pivoted clockwise to their fullest would continue to be inclined rearwardly from vertical in a general conical array. As long as operating air is flowing through the inlet passage 21 and radial port 68 the traction piston is held pressurized in its foremost position against theresistance of it return spring 42a.

The greater volume of air from the inlet passage 21 enters the distributing valve chamber 27 and at this time is directed by the position of the distributing valve 26 through housing passages and ports 71 to bleed around the piston 12 to the rear of the motor piston chamber 13. Since at this time the distributing valve 26 is blocking flow of air to the front end of the motor piston chamber 13, pressure air cannot pass through the check valve 72 of the motor piston 12 and passage 49 to pressurize the traction piston 39 of the front traction head 15. Accordingly, the traction legs 24 of the front traction head will remain collapsed during the initial stroke of the rodder, now about to take place. The live air entering the rear of the motor piston chamber 13 exerts a forward component of force upon the motor piston 12 and a rearward component upon the housing 11. The latter force is transmitted through the housing and pivot pins 58a of the legs of the rear traction head to force the lower ends of the legs slightly rearward, whereby the sharp edges of the inserts 69a at the extremities of the legs are caused to bite into the duct wall so that the legs become wedged into gripping contact with the duct wall. This wedged or gripped condition of the rear traction legs holds the rear traction head 15a stationary, whereupon the component of force acting forwardly upon the motor piston rod advances the latter forwardly into the duct relative to the motor housing. As the piston rod advances, it carries the front traction head 15 with it. In the latter action, the traction legs 24, which at this time are in collapsed condition, offer no resistance to forward movement in the duct of the front traction head.

Figure 2:
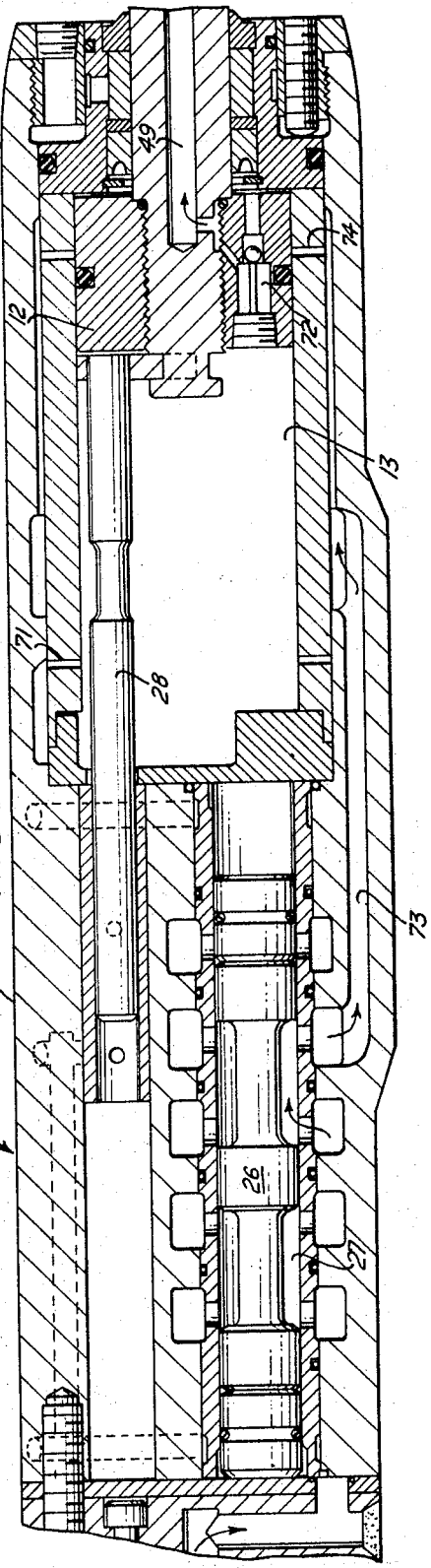
FIG. 2 is a detail in section of the motor unit showing the distributor valve mechanism and the motor piston in a condition reverse to that shown in FIGS. 1 and 1A.

Upon completion of this extended stroke of the motor piston rod, the distributor valve 26 is automatically shifted in conventional manner to the condition in FIG. 2 to now direct operating air through passage 73 and radial ports 74 and around the piston 12 to the front end of the motor piston chamber 13. Air entering the front end of the motor piston chamber passes in restricted volume through the check valve 72 in the motor piston to the piston rod passage 49 from where it flows through the radial port 48 to the rear of the traction piston chamber 41 of the front traction head 15, causing the related traction legs 24 to be pivoted into contact with the surrounding duct wall, as in the manner described with respect to the rear traction legs. The air entering the front end of the piston chamber 13 also exerts a rearward force upon the motor piston 12 and a forward force upon the motor housing 11. The rearwardly directed force is transmitted through the motor piston rod 16 and the leg pivots 58 to draw the lower ends of the traction legs 24 of the front traction head slightly rearward, whereby the traction legs 24 become wedged into gripping relation with the duct wall to hold the front traction head stationary. The forwardly directed force upon the housing 11 then drives the latter forwardly into the duct realtive to the now stationary piston rod 16. As the motor housing advances, it pulls the rear traction head 15a with it. In the latter action, the rear traction legs 24a are dragged over the duct wall, being pressed radially inward against the elastics 59a by the duct wall as the rear traction head is pulled forwardly. Upon completion of the pulling stroke of the motor housing, the distributor valve 26 is automatically reshifted in conventional manner to once more direct operating air to the rear of the motor piston chamber 13. The pressurized condition of the rear traction piston 39a remains constant because of the direct connection of its chamber 41a through the radial port 68 with the inlet passage 21; and the pressurized condition of the front traction piston 39 remains constant because the check valve 72 blocks escape of air from the traction chamber 41. The leakage around the loose pins 53 is too restricted and not fast enough between strokes of the motor housing and motor piston rod to have any relaxing effect on the pressurized condition of chamber 41. Any slight leakage that does occur is compensated for during the next time operating air is fed to the front end of the motor piston chamber. When the piston rod 16 next advances relative to the motor housing 11 to push the front traction head 15 forwardly into the duct, the front traction legs are pressed inwardly by the surrounding duct wall against the tension of the elastics 59 as they are dragged over the duct wall.

In this manner of alternate forward axial movement of the motor housing 11 and the motor piston rod 16 relative to one another, the duct rodder is advanced step by step through the duct and pulls behind it the air supply hose 22. In normal operation when the duct rodder reaches the next manhole it is removed from the air hose. A thread line (not shown) is then attached to the hose 22 and the hose is pulled back out of the duct. When the hose is pulled back to the original manhole, the thread line is disconnected and left in the duct for subsequent use.

If for some reason it should be desired to withdraw the rodder backwardly from the duct, as when its forward advance is blocked by some obstruction, the air supply to the rodder is shut "off." When this is done, the air pressurizing the piston chambers 41 and 41a of both traction heads gradually bleeds around the loose pins 53, 53a to the vented sides of the chambers, and also bleeds in part through the air control valve mechanism. The return springs 42 and 42a expand in response to this action to return the related traction pistons. As the pusher pins are carried rearwardly, they abut and push the ears of the legs to release and pivot them inwardly from the duct wall to collapsed condition. The rodder may then be freely pulled rearwardly out of the duct by means of the attached air supply hose 22. The hose is a molded plastic tube reinforced by a steel cable molded in the wall of the tube. As the rodder is being retracted from the duct, the traction legs are prevented from pivoting outwardly into engagement with the duct by means of the pusher pins. The latter, under the load of the spring biased traction pistons, abut the ears of the traction legs to hold the latter pressed inwardly in collapsed condition, as in FIG. 5.

What is claimed is:

1. In a duct rodder having an axially extending support, a traction head having a cylinder body mounted axially to the support, a group of legs arranged about the cylinder body in concentric relation to the support for pivotal movement from a normal collapsed condition overlying the support to an outward condition from the support beyond the periphery of the cylinder body, and a piston connected to the group of legs having selective reciprocable movement in the cylinder body for effecting pivoting of the legs from one condition to the other, the piston being pneumatically movable to effect pivoting of the legs to their outward condition and being spring returnable to effect pivoting of the legs to their normal collapsed condition.

2. In a duct rodder having an axially extending support, a traction head having a cylinder body mounted axially to the support, a group of legs arranged about the cylinder body in concentric relation to the support for pivotal movement from a normal collapsed condition overlying the support to an outward condition from the support beyond the periphery of the cylinder body, and a piston connected to the group of legs having selective reciprocable movement in the cylinder body for effecting pivoting of the legs from one condition to the other, wherein the connection between the legs and the piston is a group of pusher pins, each pusher pin being associated with a separate leg and having one end anchored to the piston and the other end linked to the leg.

3. In a duct rodder as in claim 2, wherein an elastic element links the said other end of the pusher pin to the leg.

4. In a duct rodder as in claim 3, wherein the elastic element tensions the leg about its pivot in a direction away from the support into abutment with an end of the related pusher pin.

5. In a duct rodder as in claim 4, wherein each leg is pivotable against the bias of its elastic element away from the related pusher pin toward the support independently of any movement of the piston upon an angularly inwardly directed pressure being exerted upon the leg.

6. In a duct rodder as in claim 2, wherein each leg has an abutment on a forward edge, and the related pusher pin has a rear end cooperable with the abutment during a rearward stroke of the piston so as to press the leg about its pivot toward the axial support.

7. In a duct rodder as in claim 2, wherein means is carried by the piston having coopeartion with each leg so as to limit the extent of such outward pivotal movement of the leg to less than ninety degrees, the limiting means being a separate pusher pin associated with each leg, each pusher pin having a rear end engageable by an opposed edge of the realted leg.

8. In a duct rodder as in claim 2, wherein means is provided for pneumatically pressurizing the piston on a forward stroke so as to carry the legs by means of the connection to their outward condition, and yieldable spring means is provided in the cylinder normally biasing the piston in an opposite direction so as to carry the legs to their collapsed condition.

9. In a duct rodder as in claim 1, wherein venting means is provided in the one end of the cylinder, and means is provided allowing bleeding of air from the opposite end of the cylinder to the vented end.

10. A duct rodder freely receivable in a duct, comprising a motor unit body having a generally cylindrical housing and a piston the one being axially advanceable relative to the other when the other is held stationary, a pair of traction heads, a piston rod projecting axially from a front end of the housing defining an axial support for one of the traction heads, a stem extending axially from a rear end of the housing defining an axial support for the other traction head; each traction head having a cylinder body mounted to the related support, a group of legs arranged about the cylinder body in concentric relation to the support for pivotal movement from a normal collapsed condition overlying the support to an outward condition from the support beyond the periphery of the cylinder body into contact with the duct wall, and a piston connected to the group of legs having selective reciprocable movement in the cylinder for effecting pivoting of the legs from one condition to the other; pneumatic means for moving the pistons of both traction heads to a forward position in which the legs are pivoted to their outward condition and for maintaining them in such position; the legs in their outward condition having an inclined rearwardly facing position and adapted upon an axial force being exerted upon the related traction head in a rearward direction to pivot further outwardly into a wedging relation with the duct wall.

References Cited

UNITED STATES PATENTS 1,810,143   6/1931   Okey _____ 254—134.6 X

LESTER M. SWINGLE, Primary Examiner

DAVID R. MELTON, Assistant Examiner